(12) United States Patent
Jeon et al.

(10) Patent No.: US 11,886,491 B2
(45) Date of Patent: Jan. 30, 2024

(54) METHOD OF ACCELERATING SIMULTANEOUS LOCALIZATION AND MAPPING (SLAM) AND DEVICE USING SAME

(71) Applicants: SAMSUNG ELECTRONICS CO., LTD., Suwon-si (KR); University of Seoul Industry Cooperation Foundation, Seoul (KR)

(72) Inventors: Myungjae Jeon, Yongin-si (KR); Kichul Kim, Seoul (KR); Yongkyu Kim, Hwaseong-si (KR); Hongseok Lee, Seoul (KR); San Kim, Changwon-si (KR); Hyekwan Yun, Seoul (KR); Donggeun Lee, Bucheon-si (KR)

(73) Assignees: SAMSUNG ELECTRONICS CO., LTD., Suwon-si (KR); University of Seoul Industry Cooperation Foundation, Seoul (KR)

( * ) Notice: Subject to any disclaimer, the term of this patent is extended or adjusted under 35 U.S.C. 154(b) by 230 days.

(21) Appl. No.: 17/326,565

(22) Filed: May 21, 2021

(65) Prior Publication Data

US 2022/0147561 A1 May 12, 2022

(30) Foreign Application Priority Data

Nov. 6, 2020 (KR) .......................... 10-2020-0148128

(51) Int. Cl.
*G06F 16/56* (2019.01)
*G06F 5/01* (2006.01)
(Continued)

(52) U.S. Cl.
CPC ................ *G06F 16/56* (2019.01); *G06F 5/01* (2013.01); *G06F 7/50* (2013.01); *G06F 7/575* (2013.01); *G06F 7/78* (2013.01); *G06F 17/16* (2013.01)

(58) Field of Classification Search
CPC ...... G06F 17/10–13; G06F 17/16; G06F 7/50; G06F 7/57; G06F 7/575; G06F 7/78;
(Continued)

(56) References Cited

U.S. PATENT DOCUMENTS

2016/0327395 A1 11/2016 Roumeliotis et al.
2017/0261324 A1 9/2017 Roumeliotis et al.
(Continued)

OTHER PUBLICATIONS

M. Kaess et al., iSAM: Incremental Smooting and Mapping, IEEE Transactions on Robotics, vol. 24, No. 6, 2008 (Year: 2008).*
(Continued)

*Primary Examiner* — Emily E Larocque
(74) *Attorney, Agent, or Firm* — Sughrue Mion, PLLC (57) ABSTRACT

A preconditioned conjugate gradient (PCG) solver, embedded in an electronic device to perform a simultaneous localization and mapping (SLAM) operation, includes an image database, a factor graph database, and a back-end processor, wherein the back-end processor is configured to receive an image from the image database to perform re-localization, receive, from the factor graph database, data for calculating six degrees of freedom (DoF)-related components, construct a matrix including the six degrees of freedom-related components based on the received data, and load and rearrange the matrix and a vector, to perform calculation on each block of each row of the matrix and the vector, then output first data, and shift second data to a location of the first data.

20 Claims, 9 Drawing Sheets

(51) Int. Cl.
*G06F 7/50* (2006.01)
*G06F 7/78* (2006.01)
*G06F 17/16* (2006.01)
*G06F 7/575* (2006.01)

(58) Field of Classification Search
CPC ......... G06F 5/01; G06F 16/56; G06T 19/003; G06T 19/006; G06T 7/00; G06T 7/30–38; G06T 7/70; G06T 7/73; G06T 7/79; G06T 7/80; G06T 7/85; G06T 2200/04; G06T 2200/08; G06T 2219/20; G06T 2219/2004
See application file for complete search history.

(56) References Cited

U.S. PATENT DOCUMENTS

| | | |
|---|---|---|
| 2018/0189587 A1 | 7/2018 | Mandal et al. |
| 2019/0003836 A1 | 1/2019 | Zhang et al. |
| 2019/0042195 A1 | 2/2019 | Kalsi et al. |
| 2019/0234746 A1 | 8/2019 | Zhang et al. |
| 2019/0346271 A1* | 11/2019 | Zhang ................. G01S 17/89 |
| 2021/0084357 A1* | 3/2021 | Tajik .................... H04N 7/157 |

OTHER PUBLICATIONS

S. Li et al., SLAM integrated mobile mapping system in complex urban environments, IPRS Journal of Photogrammetery and Remote Sensing 166, 2020 (Year: 2020).*

Communication dated Jan. 31, 2022 by the European Patent office in European Patent Application No. 21193058.1.

Dellaert, et al., "Factor Graph for Robot Perception", 2017, Foundations and trends in robotics, vol. 6, Issue 1-2, 144 pages total, XP 055882120.

Wang et al., "D-SLAM: A Decoupled Solution to Simultaneous Localization and Mapping", The International Journal of Robotics Research, 26(2):187-204, Feb. 2007, Total 22 pages.

Zhang et al., "Visual-Inertial Odometry on Chip: An Algorithm-and-Hardware Co-design Approach", Jul. 2017, Total 10 pages.

Suleiman et al., "Navion: A 2mW Fully Integrated Real-Time Visual-Inertial Odometry Accelerator for Autonomous Navigation of Nano Drones", IEEE Journal of Solid-State Circuits, vol. 54, Issue 4, Apr. 2019, Total 14 pages.

* cited by examiner

METHOD OF ACCELERATING SIMULTANEOUS LOCALIZATION AND MAPPING (SLAM) AND DEVICE USING SAME

CROSS-REFERENCE TO RELATED APPLICATION

This application is based on and claims priority under 35 U.S.C. § 119 to Korean Patent Application No. 10-2020-0148128, filed on Nov. 6, 2020, in the Korean Intellectual Property Office, the disclosure of which is incorporated by reference herein in its entirety.

BACKGROUND

1. Field

Apparatuses and methods consistent with example embodiments relate to accelerating matrix operations to shorten processes of performing simultaneous localization and mapping (SLAM), and a device using the same.

2. Description of the Related Art

In order to construct a map in a virtual space, a process of analyzing an image received from a camera or the like and determining coordinates is required. Implementation of a virtual space represented by augmented reality (AR) and virtual reality (VR) may be achieved by using a portable device, for example, glasses (for example, AR glasses).

Simultaneous localization and mapping (SLAM) may refer to a technology for constructing a map of a virtual space in real time. Various devices may update a map of a virtual space in real time by using SLAM, and rapid calculation may be required to respond to movement of a user using the devices.

SUMMARY

SLAM may be implemented by a front end processor to receive sensor information and perform feature extraction and spatial coordinate calculation, and a back end processor to optimize map information and current position information based on an output of the front end processor. The front end may be implemented mainly by using visual odometry based on camera information and an inertial navigation system (INS) using an inertial measurement unit (IMU), and various sensor fusion schemes may be applied according to types of the front end processor. In a case where the back end processor optimizes location information generated based on sensor data, together with map data, an amount of mathematical operations may greatly increase according to a size of a map, and a size and accuracy of the sensor data.

Generally, SLAM may be implemented with a combination of multiple cameras and an IMU, and mathematical operations for SLAM may be performed by processors having various performance specifications on various platforms. In particular, optimization of the back end processor requires a large amount of mathematical operations and may greatly affect the entire performance of SLAM.

SLAM, to be combined with a virtual space, may be configured to have low-power consumption to improve the wearability of a device implemented with SLAM. In a case of a low-power, low-performance back-end processor, processing of the mathematical operations may take a long time. Also, in a case of tethered SLAM for connection with a mobile device, problems due to the weight of wires for connection between devices or data latency may occur. A device (e.g., AR glasses) embedded with a high-performance processor may increase its size and power consumption.

According to an aspect of an example embodiment, there is provided an electronic device to perform a simultaneous localization and mapping (SLAM) operation, the electronic device including: an image database; a factor graph database; and a processor configured to: receive, from the image database, a map image in which a position of the electronic device is localized, to perform re-localization of the position of the electronic device in the map image; receive, from the factor graph database, data for calculating six degrees of freedom (DoF)-related components of the electronic device; construct a matrix including the six DoF-related components based on the received data; and load and rearrange the matrix and a vector that is selected from a plurality of vectors stored in a memory, to sequentially obtain first data and second data by performing calculation on each block of each row of the matrix and the vector, and shift the second data to a storage location of the first data.

The processor may be further configured to reuse as many elements as a size of the block in the calculation of the matrix and the vector.

The processor may be further configured to calculate only diagonal elements of the matrix by using properties of a scattering matrix that is derived from the map image and the data for calculating the six DoF-related components.

The processor may be further configured to calculate as many transpose elements as a maximum size of each row block in the calculation performed on each block of each row of the constructed matrix.

The processor may be further configured to output the shifted second data, and accumulate the second data and the first data.

The processor may be further configured to simultaneously perform accumulation of the first data and the second data, and shifting of the second data.

The processor may be further configured to perform the shifting of the second data by using a shift register.

Elements of the constructed matrix may include a position component, a rotation component, a linear velocity component, an acceleration component, and an angular velocity component with respect to three axes of the electronic device.

The processor may be further configured to control an interval between a first output time of the first data and a second output time of the second data according to a preset period.

The image database may store an image received from a camera of the electronic device.

According to an aspect of an example embodiment, there is provided a method of accelerating simultaneous localization and mapping (SLAM) performed by an electronic device, including: receiving, from an image database, a map image in which a position of the electronic device is localized, to perform re-localization of the position of the electronic device in the map image; receiving, from a factor graph database of the electronic device, data for calculating six degrees of freedom (DoF)-related components of the electronic device; constructing a matrix including the six DoF-related components based on the received data; and loading and rearranging the matrix and a vector that is selected from a plurality of vectors stored in a memory, to sequentially obtain first data and second data by performing calculation on each block of each row of the matrix and the vector, and then shift the second data to a storage location of the first data.

The method may further include reusing as many elements as a size of the block in the calculation performed on the matrix and the vector.

The method may further include calculating only diagonal elements of the matrix by using properties of a scattering matrix that is derived from the map image and the data for calculating the six DoF-related components.

The method may further include calculating as many transpose elements as a maximum size of each row block in the calculation performed on each block of each row of the constructed matrix.

The method may further include outputting the shifted second data, and accumulating the second data and the first data.

The outputting of the second data may include simultaneously performing accumulation of the first data and the second data, and shifting of the second data.

The method may further include performing the shifting of the second data by using a shift register.

The constructing of the matrix may include calculating a position component, a rotation component, a linear velocity component, an acceleration component, and an angular velocity component of the matrix with respect to three axes of the electronic device.

The method may further include controlling an interval between a first output time of the first data and a second output time of the second data according to a preset period.

The method may further include storing, in the image database, the map image that is generated based on an image received from a camera of the electronic device.

BRIEF DESCRIPTION OF THE DRAWINGS

The above and/or other aspects will be more apparent by describing certain example embodiments, with reference to the accompanying drawings, in which.

DETAILED DESCRIPTION

Example embodiments are described in greater detail below with reference to the accompanying drawings.

In the following description, like drawing reference numerals are used for like elements, even in different drawings. The matters defined in the description, such as detailed construction and elements, are provided to assist in a comprehensive understanding of the example embodiments. However, it is apparent that the example embodiments can be practiced without those specifically defined matters. Also, well-known functions or constructions are not described in detail since they would obscure the description with unnecessary detail.

As used herein, the term "and/or" includes any and all combinations of one or more of the associated listed items. Expressions such as "at least one of," when preceding a list of elements, modify the entire list of elements and do not modify the individual elements of the list. For example, the expression, "at least one of a, b, and c," should be understood as including only a, only b, only c, both a and b, both a and c, both b and c, all of a, b, and c, or any variations of the aforementioned examples.

The terms used in the embodiments are selected from among common terms that are currently widely used, however, the terms may be different according to an intention of one of ordinary skill in the art, a precedent, or the advent of new technology. Also, in particular cases, the terms are discretionally selected by the applicant of the present disclosure, in which case, the meaning of those terms will be described in detail in the corresponding part of the detailed description. Therefore, the terms used in the present disclosure are not merely designations of the terms, but the terms are defined based on the meaning of the terms and content throughout the present disclosure.

The terms such as "include" or "comprise" used herein should not be construed as necessarily including all various elements or operations described herein and should be understood that some of the elements or operations may be omitted or additional elements or operations may be further provided.

In the embodiments, it will be understood that when an element is referred to as being "connected to" another element, the element may be directly connected to another element or may be electrically connected to another element while having intervening elements therebetween.

It will be understood that, although the terms such as "first" or "second" may be used herein to describe various elements, these elements should not be limited by these terms. These terms are only used to distinguish one element from another element.

Figure 1:
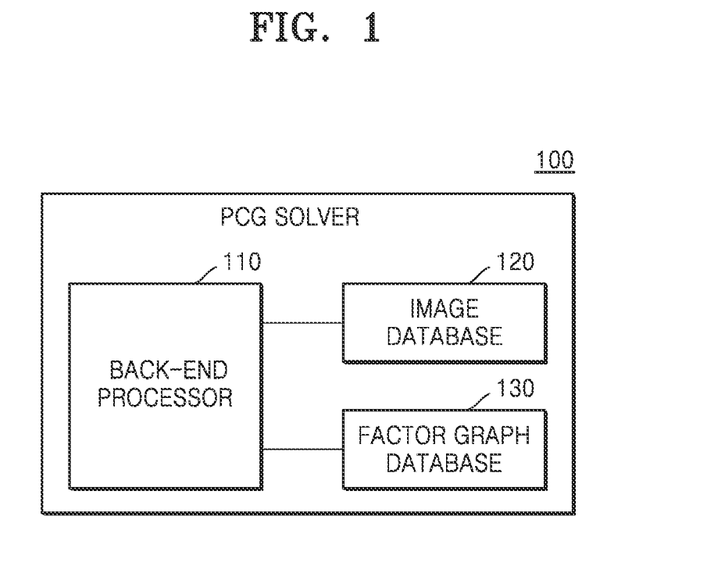
FIG. 1 is a block diagram illustrating components of a preconditioned conjugate gradient (PCG) solver, according to various embodiments.

FIG. 1 is a block diagram illustrating elements of a preconditioned conjugate gradient (PCG) solver included in an electronic device, according to various embodiments.

Referring to FIG. 1, a PCG solver 100 may include a back-end processor 110, an image database 120, and a factor graph database 130. For example, the PCG solver 100 may perform complicated multiplication operations of matrices. The PCG solver 100 may perform a multiplication operation of a matrix and/or a vector repeatedly performed. For example, the PCG solver 100 may accelerate execution of SLAM. The PCG solver 100 may efficiently process the multiplication operation of a matrix and/or a vector thereby enabling a back end processor to perform SLAM rapidly. Referring to FIG. 1, the components of the PCG solver 100 are merely exemplary and not limited thereto, and some of the elements may be substituted and/or additional elements may be further included.

Simultaneous localization and mapping (SLAM) is a technique for simultaneously performing positioning and map construction. For example, various electronic devices may perform SLAM to estimate their position in real time and construct maps of their environments. SLAM may include visual SLAM. For example, visual SLAM may include a visual odometry system. The visual odometry system may calculate and accumulate relative positions of the electronic device for every frame. For example, the visual odometry system may calculate positions of the electronic device in real time, from a starting point at which the electronic device begins to move. Because the visual odometry system performs the calculation from an image received from a camera, an error may occur due to noise of the received image. SLAM may utilize loop closure and graph optimization in addition to the visual odometry system. For example, when the electronic device returns to the starting point, a trajectory of the electronic device may be corrected by using a loop closure method.

Referring to FIG. 1, the back-end processor 110 may perform mathematical operations for optimizing SLAM performed by the PCG solver 100. For example, the electronic device may include a front-end processor configured to receive sensory data that are derived from multiple sensors (e.g., cameras, light detection and ranging (LiDAR) devices, etc.) and perform sensor fusion to combine the sensory data derived from the multiple sensors. The back-end processor 110 may receive a result of the sensor fusion from the front-end processor, and calculate an accumulated travel distance based on the result of the sensor fusion. The back-end processor 110 may receive data from the front-end processor and repeatedly perform a mathematical operation. For example, the back-end processor 110 may perform a mathematical operation on a matrix and/or a vector, to estimate a position of the electronic device and construct a map. The back-end processor 110 may estimate a position of the electronic device on the constructed map. For example, the back-end processor 110 may estimate a position of the electronic device that is moving, on the constructed map, based on the mathematical operations repeatedly performed. The back-end processor 110 may estimate a position of the electronic device in real time, and data related to the estimated position may be updated in real time. The first-end processor and the back-end processor 110 may be integrated into a single processor, or may be implemented by separate processors.

The image database 120 may store an image received from an image signal processor (ISP). The image database 120 may transmit image data for performing re-localization. For example, the back-end processor 110 may receive, from the image database 120, the image data necessary for performing SLAM. The image database 120 may receive an image (e.g., a map image that shows an area including the location of the electronic device) from the image signal processor in real time and transmit, to the back-end processor 110, the image data necessary for estimating a position of the electronic device in real time. For example, the back-end processor 110 may receive the image data from the image database 120 as the electronic device moves, and may then perform re-localization on the electronic device.

The factor graph database 130 may store data received from an inertial measurement unit (IMU). The IMU may be implemented by any one or any combination of an accelerometer, a gyroscope, a magnetometer, and a global positioning system (GPS) sensor, and may measure the position, angular rate, and orientation of an object, For example, the factor graph database 130 may store data related to triaxial coordinates measured by the inertial measurement unit. The factor graph database 130 may transmit data related to translational movements and rotational movements related to a triaxial movement of the electronic device. For example, the back-end processor 110 may receive, from the factor graph database 130, data for calculating components related to six degrees of freedom (6 DoF) of the electronic device.

An electronic device embedded with the PCG solver 100 may include an inertial sensor, an acceleration sensor, an angular velocity sensor, a magnetic sensor, a geomagnetic sensor, etc. The electronic device, in which the acceleration sensor and the angular velocity sensor operate with three axes orthogonal to each other, may be used as an IMU capable of detecting six degrees of freedom. For example, the back-end processor 110 may receive detection outputs by the acceleration sensor and the angular velocity sensor of the electronic device, and then calculate a relative position of the electronic device based on a linear acceleration and an angular velocity with respect to the three axes. The back-end processor 110 may calculate a rotation angle of a reference coordinate system of the electronic device based on the angular velocity, and calculate a velocity, that is, an integral of the acceleration, and calculate a position, that is, an integral of the velocity.

Figure 2:
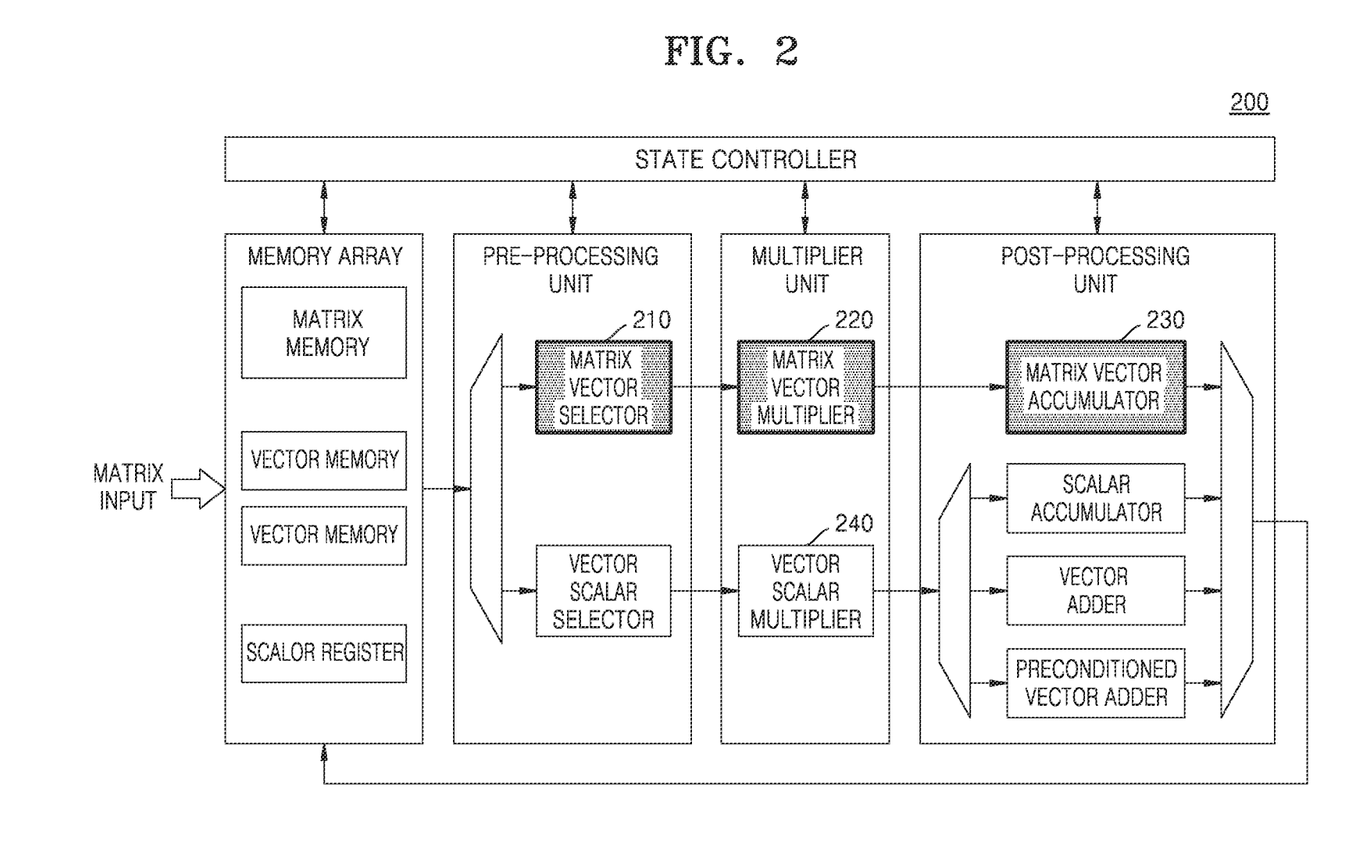
FIG. 2 is an exemplary diagram illustrating a configuration of a PCG solver, according to various embodiments.

FIG. 2 is an exemplary diagram illustrating a configuration of the PCG solver 100, according to various embodiments.

Referring to FIG. 2, the PCG solver 200 may include blocks that perform various functions. For example, the PCG solver 200 may include a state controller, a memory array, a pre-processing unit, a multiplier unit, and a post-processing unit. The configuration of the PCG solver 200 shown in FIG. 2 is merely exemplary and not limited thereto, and some of the blocks may be omitted or substituted, and/or additional blocks may be further included. The PCG solver 200 may include at least one of the configuration and/or functions of the PCG solver 100 shown in FIG. 1.

Referring to FIG. 2, a matrix and/or a vector may be selected from the memory array by the pre-processing unit, based on a matrix input to the PCG solver 200. For example, a matrix-vector selector 210 of the pre-processing unit may select a matrix and/or a vector by which the input matrix is multiplied. In addition to matrix-vector selector 210, a vector-scalar selector may select a vector and/or a scalar. For example, the vector-scalar selector may select a vector and/or a scalar by which the input matrix is multiplied.

Referring to FIG. 2, multiplying the matrix input to the PCG solver 200 by the matrix and/or the vector selected by the matrix-vector selector 210 may be performed by a matrix-vector multiplier 220. For example, the matrix-vector multiplier 220 may perform the multiplication operation of the input matrix with the matrix selected by the matrix-vector selector 210. The matrix-vector multiplier 220 may also perform the multiplication operation of the input matrix with the vector selected by the matrix-vector selector 210. For example, the matrix-vector multiplier 220 may perform the multiplication operation of the input matrix with the vector selected by the vector-scalar selector. A vector scalar multiplier 240 may perform the multiplication operation of the input matrix with the scalar selected by the vector-scalar selector.

Referring to FIG. 2, the post-processing unit of the PCG solver 200 may include a matrix-vector accumulator 230. For example, the matrix-vector accumulator 230 may accumulate, as an output, at least a portion of a result of the multiplication operation performed by the matrix-vector multiplier 220. The matrix-vector accumulator 230 may store at least a portion of the output, in the PCG solver 200 or a memory of the electronic device embedded with the PCG solver 200. A scalar accumulator may accumulate, as an output, at least a portion of the result of the multiplication operation performed by the vector scalar multiplier 240. A vector adder may perform addition of at least some of vectors of the result of the multiplication operation performed by the vector scalar multiplier 240. A preconditioned vector adder may perform addition of at least some of vectors according to a predefined condition.

Referring to FIG. 2, a processing result by the post-processing unit of the PCG solver 200 may return to the memory array. For example, the electronic device may estimate its position in real time by performing SLAM, and output data that has been used for the position estimation may be reused as a new input to update the position in real time.

Figure 3:
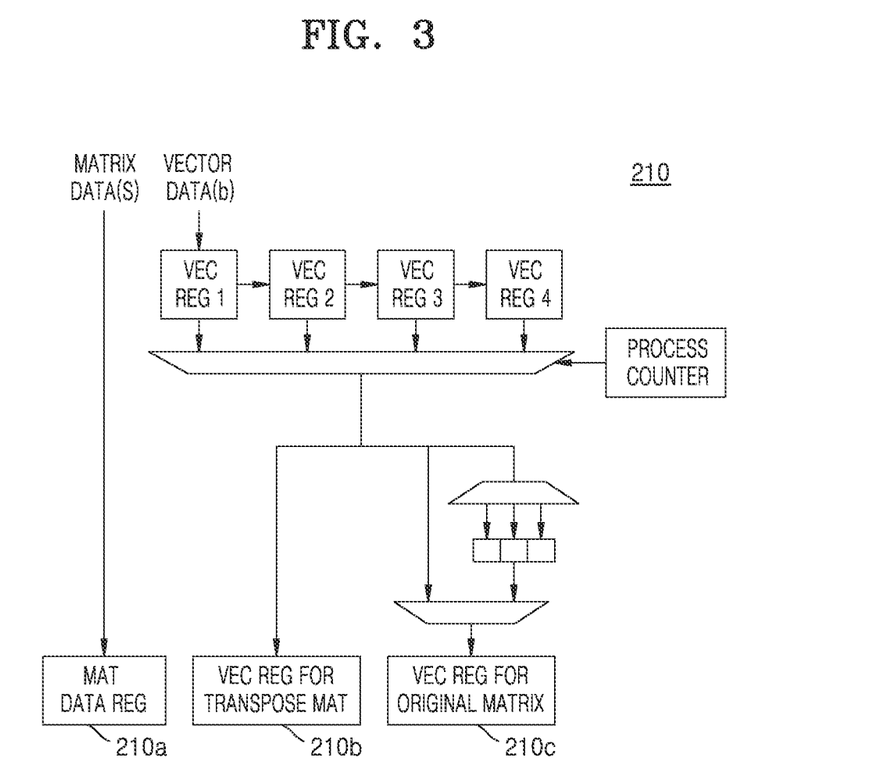
FIG. 3 is an exemplary diagram illustrating a matrix-vector selector, according to various embodiments.

FIG. 3 is an exemplary diagram illustrating the matrix-vector selector 210, according to various embodiments.

Referring to FIG. 3, the matrix-vector selector 210 may select a matrix by using matrix data S as an input. For example, the matrix data S may be used to calculate a Hessian matrix with a Schur complement. The matrix data S may be stored in a matrix data register 210a.

Referring to FIG. 3, the matrix-vector selector 210 may select a vector by using vector data b as an input. The vector data b may be input in the form of a matrix and selected. For example, the vector data b may be stored in a vector register for a transpose matrix 210b through vector registers (e.g., a vector register 1, a vector register 2, a vector register 3, and a vector register 4). The vector data b may also be stored in a vector register for an original matrix 210c through the vector registers.

Referring to FIG. 3, the matrix-vector selector 210 may select a matrix and/or a vector for optimization of a SLAM operation of the PCG solver 200. The optimization of the SLAM operation may mean acceleration of the SLAM operation. For example, the speed of the SLAM operation may depend on the processing speed of the multiplication operation of a matrix and/or a vector. In order to increase the processing speed of the multiplication operation of a matrix and/or a vector, pre-processing may be performed on transpose elements of each row of the input matrix. The back-end processor 110 of the PCG solver 200 may perform selection of a matrix and/or a vector for increasing the processing speed of the multiplication operation, by using the matrix-vector selector 210 while performing the pre-processing.

Figure 4:
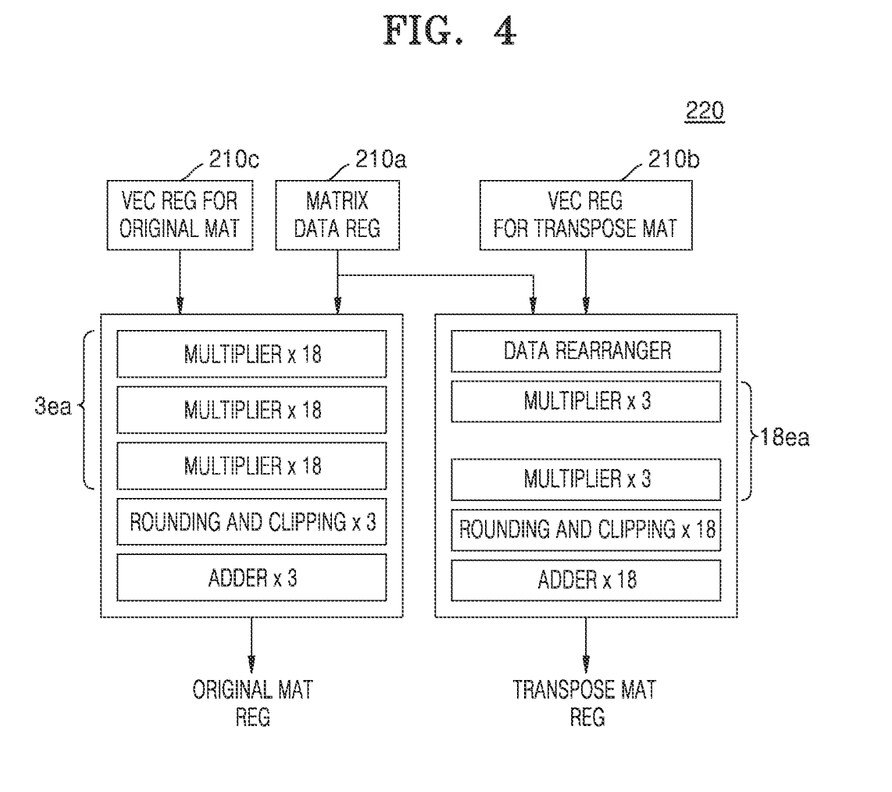
FIG. 4 is an exemplary diagram illustrating a matrix-vector multiplier, according to various embodiments.

FIG. 4 is an exemplary diagram illustrating the matrix-vector multiplier 220, according to various embodiments.

Referring to FIG. 4, the matrix-vector multiplier 220 may perform the multiplication operation of a matrix and/or a vector. For example, the matrix-vector multiplier 220 may perform the multiplication operation of a matrix (e.g., a scattering matrix) stored in the matrix data register 210a with a vector stored in the vector register 210c for an original matrix. The scattering matrix (S matrix) may correspond to a symmetric positive definite (SPD) matrix. The matrix-vector multiplier 220 may perform the multiplication operation of a matrix (e.g., S matrix) stored in the matrix data register 210a with a vector stored in the vector register 210b for a transpose matrix. The S matrix may contain, as its elements, a camera-related (triaxial) position, a camera-related (triaxial) rotation, an IMU-related (triaxial) linear velocity, an IMU-related (triaxial) acceleration, and an IMU-related (triaxial) angular velocity. The back-end processor (e.g., the back-end processor 110 of FIG. 1) of the PCG solver (e.g., the PCG solver 100 of FIG. 1 or the PCG solver 200 of FIG. 2) may configure the S matrix by using data received from the image database (e.g., the image database 120 of FIG. 1) and the factor graph database (e.g., the factor graph database 130 of FIG. 1).

Referring to FIG. 4, the matrix-vector multiplier 220 may include three sets each consisting of eighteen multipliers, three rounding and clipping units, and three adders. The matrix-vector multiplier 220 may further include a data rearranger, eighteen sets each consisting of three multipliers, eighteen rounding and clipping units, and eighteen adders. For example, the numbers of multipliers and sets of multipliers in the matrix-vector multiplier 220 may depend on a size of a matrix and/or a vector on which the multiplication operation is performed. The size of the matrix and/or the vector may be represented by "n*n".

When performing the multiplication operation with respect to a vector stored in the vector register 210c for an original matrix, the matrix-vector multiplier 220 may obtain a product having a size of n*1 as a result of the multiplication operation of a matrix having a size of n*n with a vector having a size of n*1. For example, the matrix-vector multiplier 220 may perform eighteen multiplication operations and then perform three significant addition operations. The significant addition may mean that a result of the multiplication operation is not converged to zero.

Referring to FIG. 4, the result of the multiplication operation performed by the matrix-vector multiplier 220 may be stored in an original matrix register or a transpose matrix register. For example, the result of the multiplication operation with respect to a vector for an original matrix may be stored in the original matrix register. The result of the multiplication operation with respect to a vector for a transpose matrix may be stored in the transpose matrix register. The vector registers of FIGS. 3 and 4 may be the same. For example, the vector register 210c for the original matrix of FIG. 3 may be the same as the vector register 210c for the original matrix of FIG. 4, and the original matrix register of FIG. 4 may store the result of the multiplication operation related to data of the vector register 210c for the original matrix of FIG. 3. The vector register 210b for the transpose matrix of FIG. 3 may be the same as the vector register 210b for the transpose matrix of FIG. 4, and the transpose matrix register of FIG. 4 may store the result of the multiplication operation related to data of the vector register 210b for the transpose matrix of FIG. 3.

The numbers of multipliers, rounding and clipping units, adders, and data rearrangers of the matrix-vector multiplier 220 may not be limited to the numbers shown in FIG. 4. For example, an individual operation component of the matrix-vector multiplier 220 may be determined according to a size of a matrix and/or a vector on which the multiplication operation is performed.

Figure 5:
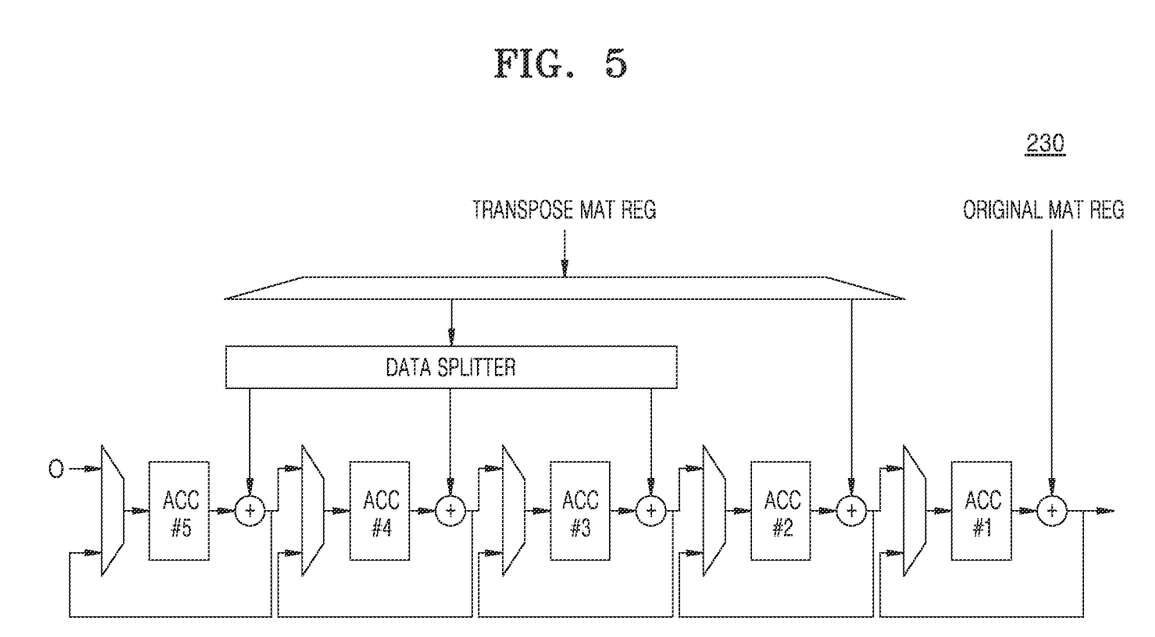
FIG. 5 is an exemplary diagram illustrating a matrix-vector accumulator, according to various embodiments.

FIG. 5 is an exemplary diagram illustrating the matrix-vector accumulator 230, according to various embodiments.

Referring to FIG. 5, the matrix-vector accumulator 230 may accumulate, as an output, at least a portion of a result of the multiplication operation performed by the matrix-vector multiplier 220. For example, the matrix-vector accumulator 230 may accumulate and store data of the original matrix register and data of the transpose matrix register, in an output order. The matrix-vector accumulator 230 may accumulate results output by the multiplication operation of a matrix and/or a vector, in sequence.

Referring to FIG. 5, the matrix-vector accumulator 230 may separate data of the transpose matrix register by using a data splitter. For example, the data splitter may split data of the product of the multiplication operation stored in the transpose matrix register such that each row is defined as one block.

Referring to FIG. 5, the matrix-vector accumulator 230 may reuse the data of the original matrix register and the data of the transpose matrix register. For example, the matrix-vector accumulator 230 may reuse the results that are accumulated and stored, to estimate the position of the electronic device embedded with the PCG solver 200.

Figure 6:
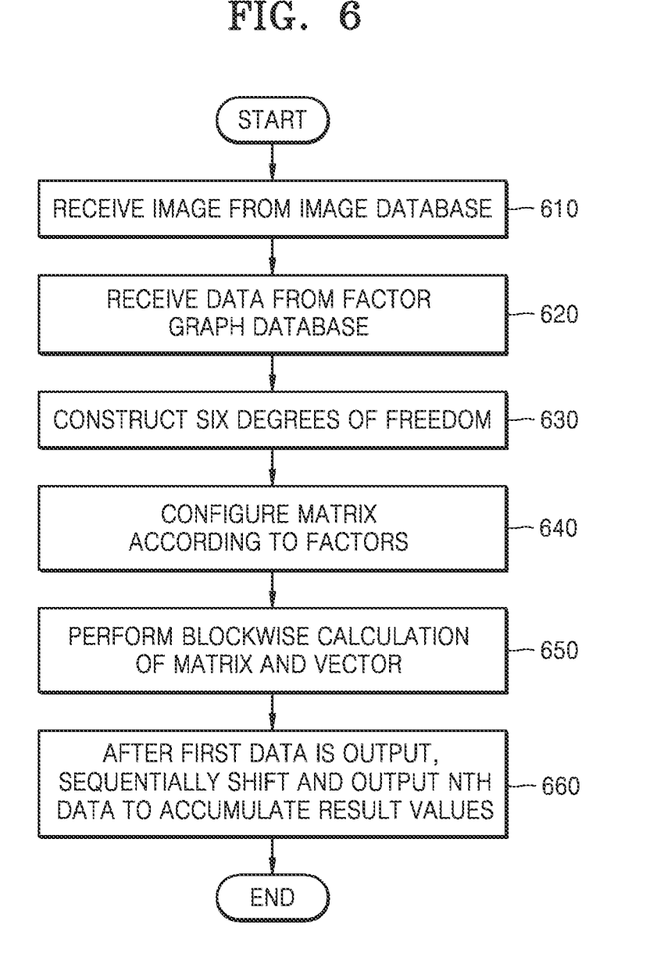
FIG. 6 is a flowchart of data operations performed by a PCG solver and their outputs, according to various embodiments.

FIG. 6 is a flowchart of data operations performed by the PCG solver 200 and their outputs, according to various embodiments.

Referring to FIG. 6, in operation 610, the PCG solver (e.g., the PCG solver 100 of FIG. 1 or the PCG solver 200 of FIG. 2) may receive an image from the image database (e.g., the image database 120 of FIG. 1). For example, the image being received may have been stored in the image database after being received from the image signal processor. The back-end processor of the PCG solver (e.g., the back-end processor 110 of FIG. 1) may perform the mathematical operations for SLAM on images stored in the image database.

Referring to FIG. 6, in operation 620, the PCG solver may receive data from the factor graph database (e.g., the factor graph database 130 of FIG. 1). For example, the factor graph database may store data for extracting six degrees of freedom-related components according to a motion of the electronic device by using the IMU. The back-end processor of the PCG solver may perform the mathematical operations for SLAM on the images stored in the factor graph database.

Referring to FIG. 6, in operation 630, the PCG solver may perform calculation of the six degrees of freedom-related components for estimating the position of the electronic device. For example, the PCG solver may perform the calculation of the six degrees of freedom-related components by using the image and data received from the image database and the factor graph database. The six degrees of freedom-related components for estimating the position of the electronic device may be related to translational movements (e.g., forward and backward movements on the X-axis, left and right movements on the Y-axis, and up and down movements on the Z-axis) and rotational movements (e.g., yaw rotation, pitch rotation, and roll rotation) with respect to three axes (e.g., an x axis, a y axis, and a z axis) of the electronic device. The back-end processor of the PCG solver may perform the calculation of the six degrees of freedom-related components by using the IMU consisting of the acceleration sensor, the angular velocity sensor, or the like, and a camera of the electronic device. For example, the six degrees of freedom-related components may include a position, a rotation, a linear velocity, an acceleration, and an angular velocity with respect to the three axes.

Referring to FIG. 6, in operation 640, the PCG solver may configure a matrix according to factors. For example, the PCG solver may configure a matrix according to fifteen factors by using the back-end processor. The fifteen factors may be obtained by calculating the six degrees of freedom-related components.

Referring to FIG. 6, in operation 650, the PCG solver may perform blockwise calculation of a matrix and a vector. For example, the back-end processor of the PCG solver may define a row of the matrix as one block. The back-end processor may perform a multiplication operation of a block of the matrix and a vector.

Referring to FIG. 6, in operation 660, the PCG solver may sequentially output and accumulate data about results of the multiplication operation of the matrix and the vector. For example, the back-end processor may output a result of the multiplication operation of a first block of the matrix and the vector, as first data. The back-end processor may shift result data output after the first data is output, to a location in which the first data has been stored. For example, the back-end processor may shift a result of the multiplication operation of each block other than the first block, and the vector, to the location in which the output first data has been stored. The back-end processor may simultaneously perform the outputting of the first data and the shifting of the result of the multiplication operation of each block other than the first block, and the vector. In operations 660, the back-end processor may simultaneously perform the outputting of the first data and shifting of nth data, wherein n denotes a natural number. The nth data may be the second data. For example, the back-end processor may shift the nth data to a location in which the first data was stored before being output, while outputting the first data to a register in which result values are accumulated. The location in which the first data was stored before being output may refer to a shift register. In operation 660, the first data and the nth data may be sequentially output and accumulated according to a calculation order of the back-end processor. The back-end processor may control the outputting of the nth data after the outputting of the first data according to a preset period. For example, the preset period may be 0.1 seconds. In a case of the preset period being a low value, the back-end processor may perform, in real time, the outputting of the first data and the nth data that correspond to result values of the calculation of the six degrees of freedom-related components of the electronic device embedded with the PCG solver.

Figure 7:
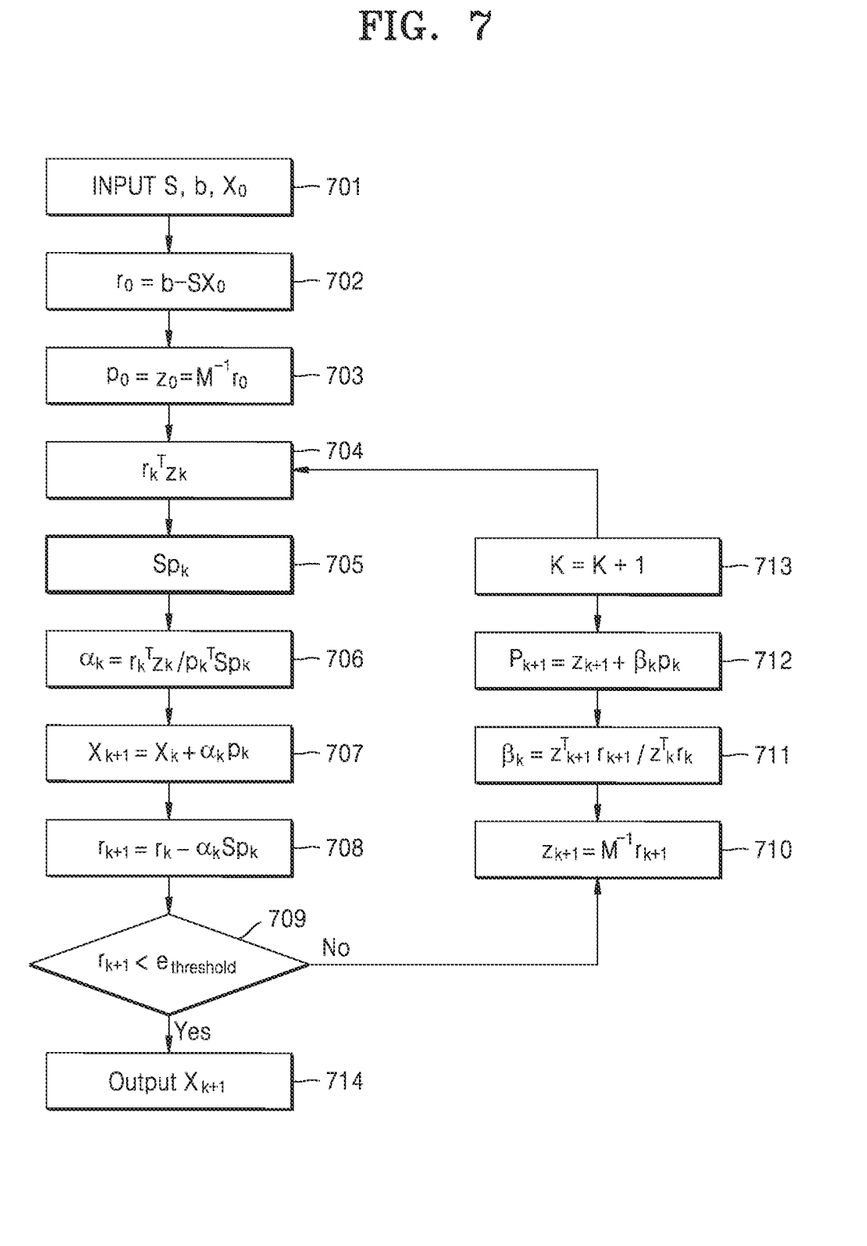
FIG. 7 is a flowchart of mathematical operations performed by a PCG solver, according to various embodiments.

FIG. 7 is a flowchart of mathematical operations performed by the PCG solver 200, according to various embodiments.

Referring to FIG. 7, the PCG solver may perform the mathematical operations by using a matrix and a vector as inputs. In operation 701, the pre-processing unit of the PCG solver may receive a matrix S and vectors b and $X_0$, from the memory array, as inputs on which the mathematical operations will be performed. For example, in operation 702, the PCG solver may obtain a product by multiplying the matrix S by the vector $X_0$, and then subtract the product of the matrix S and the vector $X_0$ from the vector b. In other words, the PCG solver may obtain a value by multiplying the matrix S by the vector $X_0$ and then multiplying by −1, and then add the value to the vector b. $r_0$ may denote a residual vector.

Referring to FIG. 7, the PCG solver may perform a mathematical operation using a preconditioner. In operation 703, the PCG solver may multiply an inverse $M^{-1}$ of the preconditioner M by the residual vector $r_0$. The inverse $M^{-1}$ of the preconditioner M may serve as a linear operator. For example, a product of the multiplication of the inverse $M^{-1}$ of the preconditioner M by the residual vector $r_0$ may equal a preconditioned residual vector $z_0$. The precondition residual vector $z_0$ may equal a search direction vector $p_0$. The search direction vector $p_0$ may determine a direction in which repeatability is made in performing all repeating operations.

Referring to FIG. 7, in operation 704, the PCG solver may multiply a transpose $r_k^T$ of a kth residual vector by a kth preconditioned residual vector $z_k$. In operations 705, the PCG solver may multiply the matrix S by a kth search direction vector $p_k$.

Referring to FIG. 7, the PCG solver may calculate a scalar α for determining a length of a step to be taken along a search direction toward a solution. For example, the PCG solver may multiply a transpose $p_k^T$ of the kth search direction vector by a product calculated in operation 705 (e.g., $p_k^T S p_k$). In operation 706, the PCG solver may divide a result value obtained in operation 704, by a value obtained by calculating $p_k^T Sp_k$. A quotient obtained in 706 may correspond to a kth scalar $\alpha_k$.

Referring to FIG. 7, the PCG solver may perform calculation related to a repetitive vector X. For example, in operation 707, the PCG solver may calculate a (k+1)th repetitive vector $X_{k+1}$. The (k+1)th repetitive vector $X_{k+1}$ may correspond to a value obtained by adding, to a kth repetitive vector $X_k$, a product of the kth scalar $\alpha_k$ and the kth search direction vector $p_k$.

Referring to FIG. 7, the PCG solver may perform calculation related to a residual vector r. For example, in operation 708, the PCG solver may calculate a (k+1)th residual vector $r_{k+1}$. The (k+1)th residual vector $r_{k+1}$ may correspond to a value obtained by subtracting, from the kth residual vector $r_k$, a product obtained by multiplying the kth scalar $\alpha_k$ by the matrix S, and then by the kth search direction vector $p_k$.

Referring to FIG. 7, the PCG solver may compare the (k+1)th residual vector $r_{k+1}$ with a threshold $e_{threshold}$. For example, in operation 709, the PCG solver may determine whether a magnitude of the (k+1)th residual vector $r_{k+1}$ is less than the threshold $e_{threshold}$.

Referring to FIG. 7, in a case where the magnitude of the (k+1)th residual vector $r_{k+1}$ has been greater than or equal to the threshold $e_{threshold}$, the PCG solver may perform operation 710. For example, the PCG solver may calculate a (k+1)th preconditioned residual vector $z_{k+1}$ by multiplying the inverse $M^{-1}$ of the preconditioner M by the (k+1)th residual vector $r_{k+1}$.

Referring to FIG. 7, the PCG solver may perform calculation of a scalar β used for conjugation of a search direction. The PCG solver may calculate a (k+1)th result value by multiplying the (k+1)th preconditioned residual vector $z^T_{k+1}$ by the (k+1)th residual vector $r_{k+1}$. The PCG solver may calculate a kth result value by multiplying a kth preconditioned residual vector $z^T_k$ by the kth residual vector $r_k$. In operation 711, the PCG solver may calculate a kth scalar $\beta_k$ by dividing the (k+1)th result value by the kth result value.

Referring to FIG. 7, the PCG solver may perform calculation of a (k+1)th search direction vector $p_{k+1}$. For example, in operation 712, the PCG solver may calculate the (k+1)th search direction vector $p_{k+1}$ by adding the (k+1)th preconditioned residual vector $z_{k+1}$, to a product obtained by multiplying the kth scalar $\beta_k$ by the kth search direction vector $p_k$.

Referring to FIG. 7, in operation 713, the PCG solver may increment k by 1. In a case where the magnitude of the (k+1)th residual vector $r_{k+1}$ has been determined to be lower than the threshold $e_{threshold}$ in operation 709, the PCG solver may perform operation 714 to output the (k+1)th repetitive vector $X_{k+1}$.

Figure 8:
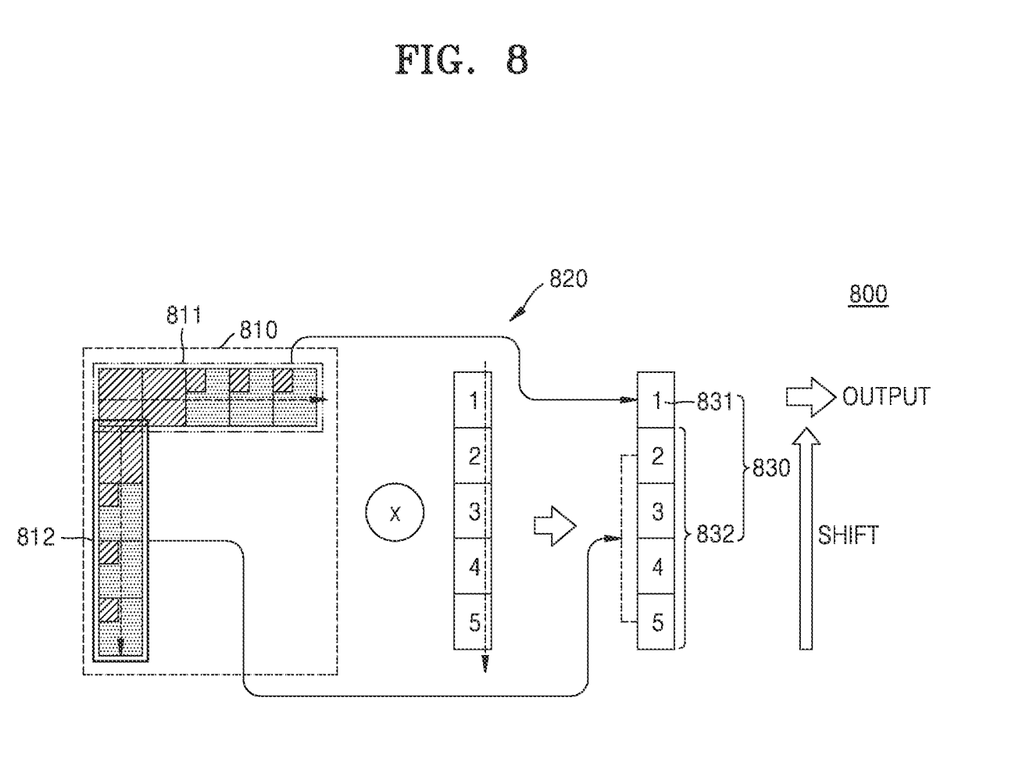
FIG. 8 is an exemplary diagram related to mathematical operations performed by a PCG solver and their outputs, according to various embodiments.

FIG. 8 is an exemplary diagram related to mathematical operations performed by the PCG solver 200 and their outputs, according to various embodiments.

An example shown in FIG. 8 may include the mathematical operations performed by the matrix-vector multiplier 220, and addition operations performed after the multiplication operation of a matrix and a vector. Mathematical operations 800 of the PCG solver may include arithmetic operations performed on a matrix and a matrix, a matrix and a vector, a vector and a vector, and a vector and a scalar.

Referring to FIG. 8, the back-end processor (e.g., the back-end processor 110 of FIG. 1) of the PCG solver may configure a matrix 810 according to the factors. The matrix 810 may have a size of 75*75, and a larger hatched area defined by the solid lines in a row block 811 may depict a submatrix having a size of 15*15. A smaller hatched area in the row block 811 may depict a submatrix having a size of 6*6 and may be related to a position and a rotation among the six degrees of freedom-related components. A dotted area defined by the solid lines other than the smaller hatched area in the row block 811 may depict a submatrix defined by excluding the submatrix of the smaller hatched area from the 15*15 submatrix. The submatrix depicted by the dotted area may include triaxial components for an IMU velocity, an IMU acceleration, and an IMU angular velocity. Descriptions of a size and included areas of a column block 812 may be replaced with the descriptions of the row block 811.

Referring to FIG. 8, the PCG solver (e.g., the PCG solver 100 of FIG. 1 or the PCG solver 200 of FIG. 2) may perform calculation for each row block 811 of the matrix 810 in order to rapidly process the multiplication operations of a matrix and a vector. The PCG solver may access data of a maximum size for each row, on which calculation is performed, such that the calculation may be performed on transpose elements as well at once. The column block 812 may correspond to the transpose elements, and thus the mathematical operations may be minimized. For the mathematical operations performed on the vector, the PCG solver may access each element of the vector as many times as its size, to sequentially perform the mathematical operations, and then shift to access a next element.

The example shown in FIG. 8 may correspond to the mathematical operations with a maximum track size set as 5. A number of multiplication operations, that is, equal to the maximum track size, may be performed on a submatrix and each element of the vector. For each row, the calculation may be performed on the transpose elements as well at once. Referring to FIG. 8, data corresponding to result values of the multiplication and addition operations of the matrix 810 and the vector may be stored in an output vector 830. In the mathematical operations with respect to the row block, products of elements of the submatrix and the vector may be calculated, then an addition operation may be performed on the products, and resulting sums may be stored in a first output subvector 831. An individual subvector may have a size of 15*1. The transpose elements may be calculated with the vector, and then result values may be stored in second to fifth output subvectors 832, respectively. When a corresponding mathematical operation is performed for each row, calculation results calculated for the transpose elements may be accumulated, and when a current row becomes the first row, the calculation may be finished and output vectors for the corresponding row may be derived as result values.

Figure 9:
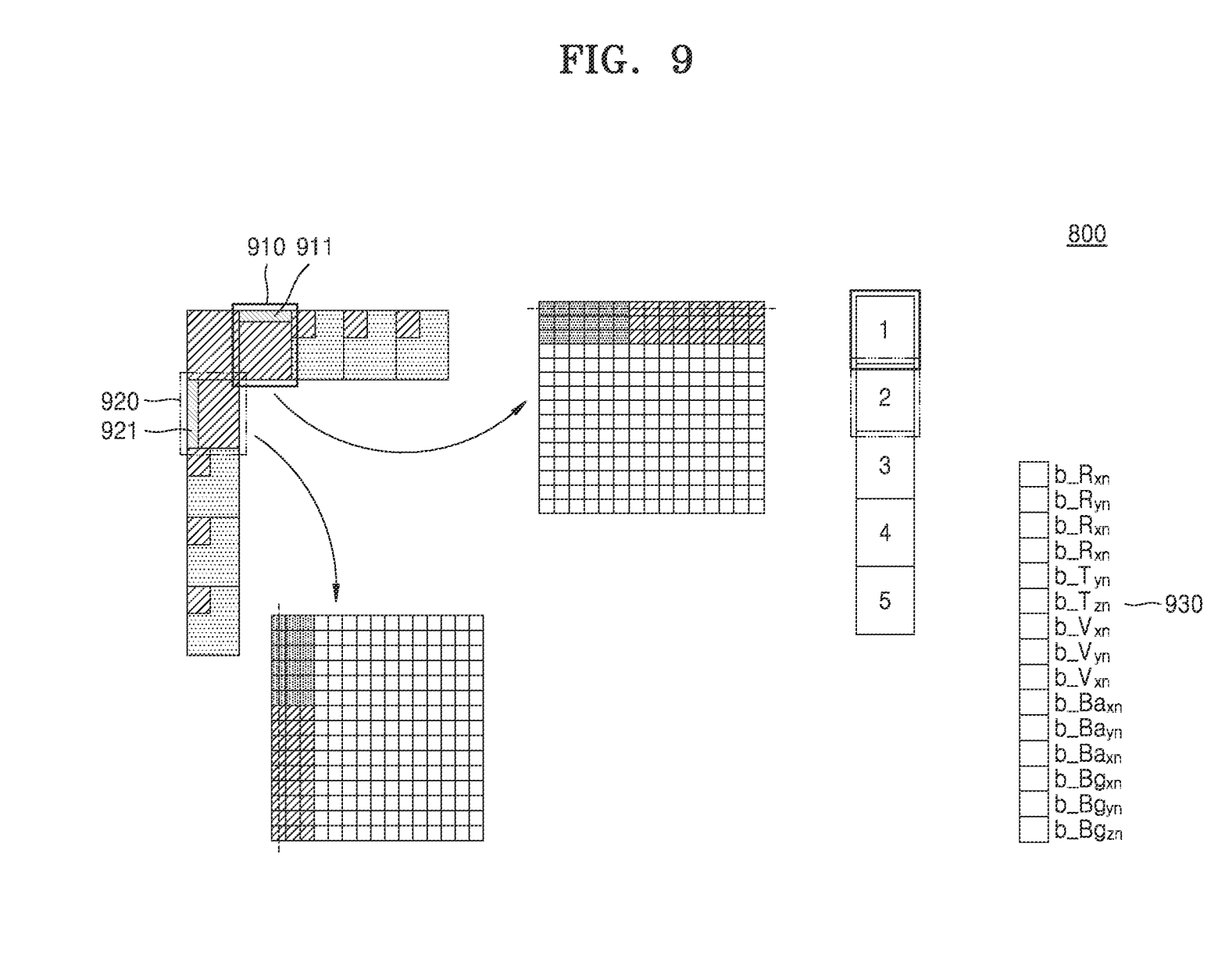
FIG. 9 is an exemplary diagram related to mathematical operation simplification and resulting outputs of a PCG solver, according to various embodiments.

FIG. 9 is an exemplary diagram related to mathematical operation simplification and resulting outputs of the PCG solver 200, according to various embodiments.

An example 800 shown in FIG. 9 may be the same as the example shown in FIG. 8 and may correspond to an example for accelerating mathematical operation processes. The PCG solver (e.g., the PCG solver 100 of FIG. 1 or the PCG solver 200 of FIG. 2) may access and process fifteen-line data 911 of a component 910 (e.g., a 15*15 submatrix) of each row block at once by accessing a plurality of lines. Processing at once may mean that the mathematical operations are performed at once. Data related to the six degrees of freedom-related components excluding IMU-related components, from among fifteen pieces of data, may be a 6*6 block, and thus corresponding blocks may be collected and then processed at once. Referring to FIG. 9, the PCG solver may process three lines at once, and the mathematical operations may also be simultaneously performed on three lines of the transpose elements.

Referring to FIG. 9, products and sums calculated from the matrix and the vector may be stored in a column vector.

The column vector may have individual blocks of a size of 15*15. For example, components 930 of the individual block may correspond to a position, a rotation, a linear velocity, an acceleration, and an angular velocity. $R_{xn}$, $R_{yn}$ and $R_{zn}$ may be the six degrees of freedom-related components. $R_{xn}$ may be a rotation component with respect to the x axis, $R_{yn}$ may be a rotation component with respect to the y axis, and $R_{zn}$ may be a rotation component with respect to the z axis, from among the six degrees of freedom-related components. $T_{xn}$, $T_{yn}$, and $T_{zn}$ may be the six degrees of freedom-related components. $T_{xn}$ may be a position component with respect to the x axis, $T_{yn}$ may be a position component with respect to the y axis, and $T_{zn}$ may be a position component with respect to the z axis, from among the six degrees of freedom-related components.

Referring to FIG. 9, the components 930 of the individual block may be the six degrees of freedom-related components (in particular, IMU-related components). For example, $V_{xn}$, $V_{yn}$, and $V_{zn}$ may be linear velocity-related components among the six degrees of freedom-related components. $V_{xn}$ may be a linear velocity component with respect to the x axis, $V_{yn}$ may be a linear velocity component with respect to the y axis, and $V_{zn}$ may be a linear velocity component with respect to the z axis, from among the six degrees of freedom-related components. $Ba_{xn}$, $Ba_{yn}$, and $Ba_{zn}$ may be acceleration-related components among the six degrees of freedom-related components. $Ba_{xn}$ may be an acceleration component with respect to the x axis, $Ba_{yn}$ may be an acceleration component with respect to the y axis, and $Ba_{zn}$ may be an acceleration component with respect to the z axis, from among the six degrees of freedom-related components. $Bg_{xn}$, $Bg_{yn}$, and $Bg_{zn}$ may be angular velocity-related components among the six degrees of freedom-related components. $Bg_{xn}$ may be an angular velocity component with respect to the x axis, $Bg_{yn}$ may be an angular velocity component with respect to the y axis, and $Bg_{zn}$ may be an angular velocity component with respect to the z axis, from among the six degrees of freedom-related components.

A preconditioned conjugate gradient (PCG) solver, embedded in an electronic device to perform a simultaneous localization and mapping (SLAM) operation, may include an image database, a factor graph database, and a back-end processor, wherein the back-end processor is configured to receive an image from the image database to perform re-localization, receive, from the factor graph database, data for calculating six degrees of freedom (DoF)-related components, construct a matrix including the six degrees of freedom-related components based on the received data, and load and rearrange the matrix and a vector, to perform calculation on each block of each row of the matrix and the vector, then output first data, and shift second data to a location of the first data.

A back-end processor of the PCG solver performing the SLAM operation may reuse as many elements as a size of the block in the calculation of the matrix and the vector.

The back-end processor of the PCG solver performing the SLAM operation may calculate only diagonal elements of the matrix by using properties of a scattering matrix (S matrix).

The back-end processor of the PCG solver performing the SLAM operation may also calculate as many transpose elements as a maximum size of each row block in the calculation performed on each block of each row of the constructed matrix.

The back-end processor of the PCG solver performing the SLAM operation may output the shifted second data, and accumulate and output the second data together with the first data.

The back-end processor of the PCG solver performing the SLAM operation may simultaneously perform the accumulating of the first data and the shifting of the second data.

The back-end processor of the PCG solver performing the SLAM operation may perform the shifting of the second data by using a shift register.

Elements of the matrix constructed by the PCG solver performing the SLAM operation may include position, rotation, linear velocity, acceleration, and angular velocity components with respect to three axes of the electronic device.

The back-end processor of the PCG solver performing the SLAM operation may control an interval between the outputting of the first data and the outputting of the second data according to a preset period.

The image database of the PCG solver performing the SLAM operation may store an image received from a camera of the electronic device.

A method of accelerating simultaneous localization and mapping (SLAM) performed by a preconditioned conjugate gradient (PCG) solver embedded in an electronic device, may include receiving an image from an image database to perform re-localization, receiving, from a factor graph database, data for calculating six degrees of freedom (DoF)-related components, constructing a matrix including the six degrees of freedom-related components based on the received data, and loading and rearranging the matrix and a vector, to perform calculation on each block of each row of the matrix and the vector, then output first data, and shift second data to a location of the first data.

The method of accelerating simultaneous localization and mapping (SLAM) performed by a preconditioned conjugate gradient (PCG) solver may further include reusing as many elements as a size of the block in the calculation performed on the matrix and the vector.

The method of accelerating simultaneous localization and mapping (SLAM) performed by a preconditioned conjugate gradient (PCG) solver may further include calculating only diagonal elements of the matrix by using properties of a scattering matrix.

The method of accelerating simultaneous localization and mapping (SLAM) performed by a preconditioned conjugate gradient (PCG) solver may further include calculating as many transpose elements as a maximum size of each row block in the calculation performed on each block of each row of the constructed matrix.

The method of accelerating simultaneous localization and mapping (SLAM) performed by a preconditioned conjugate gradient (PCG) solver may further include outputting the shifted second data, and accumulating and outputting the second data together with the first data.

The outputting of the second data in the method of accelerating simultaneous localization and mapping (SLAM) performed by a preconditioned conjugate gradient (PCG) solver may include simultaneously performing the accumulating of the first data and the shifting of the second data.

The method of accelerating simultaneous localization and mapping (SLAM) performed by a preconditioned conjugate gradient (PCG) solver may further include performing the shifting of the second data by using a shift register.

The constructing of the matrix in the method of accelerating simultaneous localization and mapping (SLAM) performed by a preconditioned conjugate gradient (PCG) solver may include calculating position, rotation, velocity, acceleration, and angular velocity components with respect to three axes of the electronic device.

The method of accelerating simultaneous localization and mapping (SLAM) performed by a preconditioned conjugate gradient (PCG) solver may further include controlling an interval between the outputting of the first data and the outputting of the second data according to a preset period.

The method of accelerating simultaneous localization and mapping (SLAM) performed by a preconditioned conjugate gradient (PCG) solver may further include storing, in the image database, an image received from a camera of the electronic device.

As a processing speed of mathematical operations of the back-end processor increases, time required for performing an overall operation of SLAM may be shortened. In a case of performing a multiplication operation on a matrix and a vector requiring a large amount of operation, the back-end processor may increase a processing speed of the operation by using properties of an S matrix.

The back-end processor of a preconditioned conjugate gradient (PCG) solver may be configured in various devices to prevent data transmission and reception delay. In a case of a low-power, low-performance back-end processor, a size and power consumption of the device in which the back-end processor is embedded may be reduced.

While not restricted thereto, an example embodiment can be embodied as computer-readable code on a computer-readable recording medium. The computer-readable recording medium is any data storage device that can store data that can be thereafter read by a computer system. Examples of the computer-readable recording medium include read-only memory (ROM), random-access memory (RAM), CD-ROMs, magnetic tapes, floppy disks, and optical data storage devices. The computer-readable recording medium can also be distributed over network-coupled computer systems so that the computer-readable code is stored and executed in a distributed fashion. Also, an example embodiment may be written as a computer program transmitted over a computer-readable transmission medium, such as a carrier wave, and received and implemented in general-use or special-purpose digital computers that execute the programs. Moreover, it is understood that in example embodiments, one or more units of the above-described apparatuses and devices can include circuitry, a processor, a microprocessor, etc., and may execute a computer program stored in a computer-readable medium.

The foregoing exemplary embodiments are merely exemplary and are not to be construed as limiting. The present teaching can be readily applied to other types of apparatuses. Also, the description of the exemplary embodiments is intended to be illustrative, and not to limit the scope of the claims, and many alternatives, modifications, and variations will be apparent to those skilled in the art.

What is claimed is:

1. An electronic device to perform a simultaneous localization and mapping (SLAM) operation, the electronic device comprising:
   an image database;
   a factor graph database; and
   a processor comprising:
   a pre-processing unit configured to:
      receive, from the image database, a map image in which a position of the electronic device is localized;
      receive, from the factor graph database, inertial measurement unit (IMU) sensor data; and
      configure a matrix according to fifteen factors, said fifteen factors being obtained by calculating six DoF-related components of the electronic device, said matrix defined by a plurality of row blocks divided in submatrices of 15×15, wherein each of the submatrices has a sub-submatrix of 6×6 related to a position and a rotation among the six DoF-related components and a remaining part including triaxial components for the IMU sensor data;
   a multiplier unit configured to, for each of the plurality of row blocks of the matrix, perform a multiplication of a row block and a vector, and sequentially output a result of the multiplication of the row block of the plurality of row blocks and the vector as first data; and
   a post-processing unit configured to simultaneously shift second data which is a result of a multiplication of each following row block of the plurality of row blocks and the vector to a location in which the first data has been stored.

2. The electronic device of claim 1, wherein the multiplier unit is further configured to reuse as many elements as a size of the row block in the calculation of the matrix and the vector.

3. The electronic device of claim 1, wherein the pre-processing unit is further configured to calculate only diagonal elements of the matrix by using properties of a scattering matrix that is derived from the map image and the IMU sensor data.

4. The electronic device of claim 1, wherein the multiplier unit is further configured to calculate as many transpose elements as a maximum size of each row block in the calculation performed on each row block of the matrix.

5. The electronic device of claim 1, wherein the post-processing unit is further configured to output the shifted second data, and accumulate the second data and the first data.

6. The electronic device of claim 5, wherein the post-processing unit is further configured to simultaneously perform accumulation of the first data and the second data, and shifting of the second data.

7. The electronic device of claim 6, wherein the post-processing unit is further configured to perform the shifting of the second data by using a shift register.

8. The electronic device of claim 1, wherein elements of the matrix include a position component, a rotation component, a linear velocity component, an acceleration component, and an angular velocity component with respect to three axes of the electronic device.

9. The electronic device of claim 1, wherein the processor is further configured to control an interval between a first output time of the first data and a second output time of the second data according to a preset period.

10. The electronic device of claim 1, wherein the image database stores an image received from a camera of the electronic device.

11. A method of accelerating simultaneous localization and mapping (SLAM) performed by an electronic device, the method comprising:
   receiving, from an image database, a map image in which a position of the electronic device is localized;
   receiving, from a factor graph database of the electronic device, inertial measurement unit (IMU) sensor data;
   configuring a matrix according to fifteen factors, said fifteen factors being obtained by calculating six DoF-related components of the electronic device, said matrix defined by a plurality of row blocks divided in submatrices of 15×15, wherein each of the submatrices has a sub-submatrix of 6×6 related to a position and a rotation among the six DoF-related components and a remaining part including triaxial components for the IMU sensor data; and for each of the plurality of row blocks of the matrix, performing a multiplication of a row block and a vector, and sequentially outputting a result of the multiplication of the row block of the plurality of row blocks and the vector as first data and simultaneously shifting second data which is a result of a multiplication of each following row block of the plurality of row blocks and the vector to a location in which the first data has been stored.

12. The method of claim 11, further comprising reusing as many elements as a size of the row block in the calculation performed on the matrix and the vector.

13. The method of claim 11, further comprising calculating only diagonal elements of the matrix by using properties of a scattering matrix that is derived from the map image and the IMU sensor data.

14. The method of claim 11, further comprising calculating as many transpose elements as a maximum size of each row block in the calculation performed on each row block of the matrix.

15. The method of claim 11, further comprising outputting the shifted second data, and accumulating the second data and the first data.

16. The method of claim 15, wherein the outputting of the second data includes simultaneously performing accumulation of the first data and the second data, and shifting of the second data.

17. The method of claim 16, further comprising performing the shifting of the second data by using a shift register.

18. The method of claim 11, wherein the constructing of the matrix includes calculating a position component, a rotation component, a linear velocity component, an acceleration component, and an angular velocity component of the matrix with respect to three axes of the electronic device.

19. The method of claim 11, further comprising controlling an interval between a first output time of the first data and a second output time of the second data according to a preset period.

20. The method of claim 11, further comprising storing, in the image database, the map image that is generated based on an image received from a camera of the electronic device.

* * * * *